Patented May 27, 1952

2,598,653

UNITED STATES PATENT OFFICE 2,598,653

21-SUBSTITUTED THIOACETALS OF 20-OXO-PREGNANES AND 20-OXO-PREGNENES

Albert Wettstein and Charles Meystre, Basel, Switzerland, assignors to Ciba Pharmaceutical Products, Inc., Summit, N. J.

No Drawing. Application July 10, 1950, Serial No. 173,001. In Switzerland July 22, 1949

6 Claims. (Cl. 260—397.5)

The present invention relates to 21-substituted thioacetals of the 20-oxo-pregnanes and 20-oxo-pregnenes and to the preparation thereof.

The conversion of ketones into the corresponding acetals is a known reaction. It has also been repeatedly applied in steroid chemistry. Thus for example 3-, 7-, 12- or 20-oxo-pregnanes, as well as the corresponding pregnenes, which are unsubstituted in 21-position, can be converted without noteworthy difficulty into the corresponding acetals. However, it has not heretofore been possible to prepare the acetals of the 20-oxo-pregnanes and 20-oxo-pregnenes which are substituted in the 21-position.

A primary object of the present invention is the embodiment of acetals—and, more specifically, the thioacetals—of the aforesaid 21-substituted 20-oxo-pregnanes and 21-substituted 20-oxo-pregnenes and the development of a method for the preparation thereof.

It has been found, briefly stated, that by reacting the initial 21-substituted 20-oxo-pregnane or corresponding pregnene with a mercapto compound, more particularly an alkyl mercaptan, such as methyl mercaptan, ethyl mercaptan, benzyl mercaptan, ethylene dimercaptan and the like, in the presence of an acid catalyst such for example as hydrochloric acid, sulfuric acid or toluene-sulfonic acid, the desired thioacetal (mercaptol) of the starting compound is produced. It has further been found that the reaction takes place in most cases even at about 0° C. It is preferable to work with an excess of the reactant mercaptan, which thus serves as the solvent medium. However, other diluents, such as the conventional organic solvents, can also be employed. The chemistry of the pregnane compounds, in particular that of the hormones of the suprarenal cortex, is thus enriched by a particularly valuable reaction. The so obtained thioacetals of 20-oxo-pregnanes and 20-oxo-pregnenes, such as dialkyl- or diaralkyl-thioacetals, especially dimethyl-, diethyl-, dipropyl-, dibutyl- or dibenzyl-thioacetals are new compounds.

The 20-oxo-pregnanes and 20-oxo-pregnenes which serve as starting materials in the instant invention are substituted in the 21-position by a free or functionally converted hydroxyl group, for example an acyloxy group such as acetoxy, propionyloxy, benzoyloxy, or tosyloxy groups, or an alkoxy group such as a methoxy or ethoxy group, or by a halogen atom such as chlorine or bromine. They may also bear similar substituents or oxo groups in the 6-, 7-, 12- and in particular in the 3- and 11-positions, and they may bear epoxy groups, for example in the 3,9- and 16,17-positions. They can further have double bonds, for example in 3-, 4-, 5-, 11- and/or 16-position. also corresponding isomeric pregnane derivatives, for example pentacyclic i-pregnane, 17-iso-pregnane or allo-pregnane compounds, as well as the corresponding pregnenes may be used as starting materials.

The new products may be employed as therapeutic agents. They are however particularly valuable as intermediate products for the manufacture of therapeutically active compounds.

The following examples illustrate the invention, the parts being by weight unless otherwise stated and the relation between parts by weight and parts by volume being the same as that between the kilogram and the litre; temperatures are in degrees centigrade.

Example 1

3 parts $\Delta^5$-3,21-diacetoxy-pregnene-20-one are covered with 10 parts by volume of carbon tetrachloride and 3 parts by volume of ethyl mercaptan and stirred using a calcium chloride moisture seal. Thereupon at 0°, a slow stream of hydrogen chloride is passed over the liquid. After 2 hours stirring, the solution is concentrated in vacuum at 20°. The oily residue is taken up in ether, the ethereal solution washed with dilute sodium carbonate solution and water, dried and evaporated. The oily reaction product is the $\Delta^5$-3,21-acetoxy-pregnene-20-one-diethyl-thioacetal of the formula

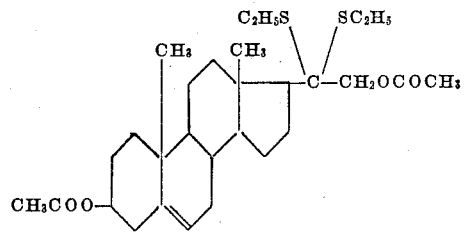

By carrying out the above reaction with benzyl mercaptan instead of ethyl mercaptan the $\Delta^5$-3,21-diacetoxy-pregnene-20-one-dibenzyl-thioacetal is obtained.

Example 2

5 parts of $\Delta^5$-3-hydroxy-21-acetoxy-pregnene-20-one are covered with 50 parts by volume of dioxane and 5 parts by volume of ethyl mercaptan. 2.5 parts of dehydrated calcium sulfate are added to the solution and then, while maintaining a calcium chloride moisture seal, hydrogen chloride is slowly passed over the liquid at 0°. After stirring for 10 hours, the calcium sulfate is filtered off with suction and the filtrate evaporated in vacuum. The oily residue is taken up in ether, the ethereal solution washed with diulte sodium carbonate solution and water, dried and evaporated. The oil, obtained as residue, is the $\Delta^5$-3-hydroxy-21-acetoxy-pregnene-20-one-diethyl-thioacetal of the formula

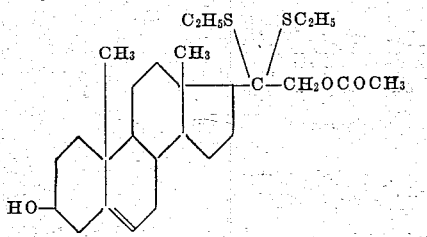

By chromatographic purification over aluminum oxide, it can be obtained in the form of the pure oil. For most purposes, however, this operation is superfluous.

In an analogous manner $\Delta^5$-3-hydroxy-21-acetoxy-pregnene-20-one-dibutyl-thioacetal is obtained.

Example 3

2 parts of 3,21-diacetoxy-allo-pregnane-20-one are covered with 5 parts by volume of ethyl mercaptan and 10 parts by volume of chloroform. Thereupon, at 20°, while stirring and while maintaining a calcium chloride moisture seal, a slow stream of hydrogen chloride is passed over the liquid. After 18 hours, the solution is concentrated in vacuum. The residue is taken up in ether, the ethereal solution is washed with dilute sodium carbonate solution and water, dried and evaporated. The oil which remains behind contains the 3,21-diacetoxy-allo-pregnane-20-one-diethyl-thioacetal of the formula

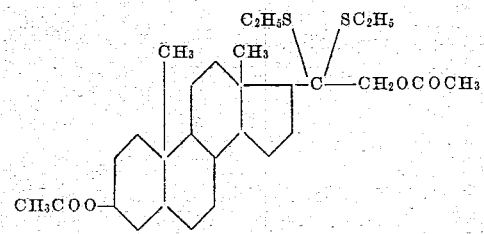

It may be directly used further, or may be converted into the pure oily thioacetal by chromatographic purification over aluminum oxide.

Example 4

5 parts of 3,21-dihydroxy-12-acetoxy-pregnane-20-one are dissolved in 5 parts by volume of ethyl mercaptan. While stirring and maintaining a calcium chloride moisture seal, hydrogen chloride is then passed slowly over the liquid. After 10 hours, the solution is evaporated in vacuum, the residue taken up in ether, the ethereal solution washed with dilute sodium carbonate solution and water, dried and evaporated. The thus-obtained crude oily 3,21-dihydroxy-12-acetoxy-pregnane-20-one-diethyl-thioacetal of the formula

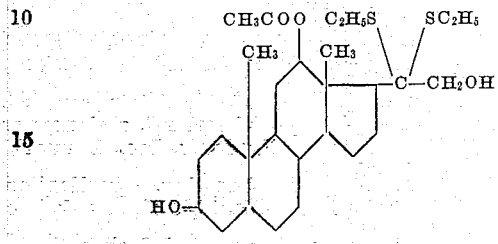

can be purified by chromatography over aluminum oxide (preferably after acetylation) or may be further used as the crude product.

By replacing in the above example ethyl-mercaptan by methyl mercaptan the 3,21-dihydroxy-12-acetoxy-pregnane-20-dimethyl-thioacetal is formed.

Having thus disclosed the invention, what is claimed is:

1. A lower dialkyl-thioacetal selected from the group consisting of the lower dialkyl-thioacetals of the 20-oxo-pregnanes and 20-oxo-pregnenes, which are substituted in the 21-position by a member selected from the group consisting of a free hydroxyl group and a hydroxyl group esterified with a lower alkanoic acid.

2. Lower dialkyl-thioacetals of 20-oxo-pregnanes, which are substituted in 12-position by a hydroxyl group esterified with a lower alkanoic acid and in the 21-position by a member selected from the group consisting of a free hydroxyl group and a hydroxyl group esterified with a lower alkanoic acid.

3. Lower dialkyl-thioacetals of $\Delta^5$-20-oxo-pregnenes, which are substituted in the 21-position by a member selected from the group consisting of a free hydroxyl group and a hydroxyl group esterified with a lower alkanoic acid.

4. The $\Delta^5$-3,21-diacetoxy-pregnene-20-one-diethyl-thioacetal.

5. The $\Delta^5$-3-hydroxy-21-acetoxy-pregnene-20-one-dibutyl-thioacetal.

6. The 3,21-dihydroxy-12-acetoxy-pregnane-20-one-diethyl-thioacetal.

ALBERT WETTSTEIN.
CHARLES MEYSTRE.

No references cited.